Aug. 20, 1968  E. E. KOCH  3,397,584

DUAL RAKE BUSHING FOR SICKLE DRIVES

Filed Aug. 25, 1966

INVENTOR.

EARL E. KOCH

BY

*Joseph A. Brown*

ATTORNEY

United States Patent Office 3,397,584
Patented Aug. 20, 1968

3,397,584
DUAL RATE BUSHING FOR SICKLE DRIVES
Earl E. Koch, Mohnton, Pa., assignor to Sperry Rand Corporation, New Holland, Pa., a corporation of Delaware
Filed Aug. 25, 1966, Ser. No. 575,127
4 Claims. (Cl. 74—60)

ABSTRACT OF THE DISCLOSURE

A dual rate bushing for a sickle drive having a horizontally extending drive arm supported for pivotal movement about a vertical axis, one end of the arm being pivotally connected to the sickle through a resilient bushing, while the other end of the arm is connected to an oscillatory drive means, whereby as the drive means oscillates the drive arm, the reciprocating driving force is transferred to the sickle through the resilient bushing due to the torsional characteristics thereof.

---

This invention relates generally to a drive mechanism for reciprocating a sickle in an agricultural machine. More particularly, the invention relates to an improved connection between an oscillating drive mechanism and a sickle.

Sickles in forage cutting machines are frequently driven by wobble drive elements which provide means for changing a rotatable driving force to an oscillating action. One design commonly employed is to connect a wobble element to a shaft to oscillate the shaft about a vertically extending axis. At its lower end the shaft connects to a horizontally extending drive arm which projects radially of the shaft and forwardly. Adjacent its forward end, the drive arm is connected to one end of the sickle to be reciprocated.

In driving the sickle, the connection between the drive arm and the sickle element needs to pivot, usually in the range of twenty to thirty degrees. Conventionally, a rotatable connection is provided in this location, such as a bronze bushing and this bushing has to be lubricated. If the connection is not kept lubricated, the rotating surfaces will wear and the parts will fail. This problems is greater when a drive arm having a relatively short length is employed because the shorter the arm the greater the angular movement of the drive arm relative to the sickle to give a desired length of stroke.

One object of this invention is to provide a drive arm and sickle connection assembly which will allow pivoted movement of the arm relative to the sickle without slidable rotation of the surfaces of the parts of the assembly.

Another object of this invention is to provide a drive arm and sickle connection which does not require lubrication.

Another object of this invention is to provide a connection which is particularly suitable where a relatively short drive arm is employed and a standard length of stroke involving substantial angular movement between the drive arm and the sickle drive head.

Another object of this invention is to provide a drive arm and sickle connection of the character described wherein the sickle is cushioned on both working and return strokes so that when the sickle changes direction, the shock loads resulting therefrom are absorbed.

A further object of this invention is to provide a drive arm and sickle connection assembly of the character described which will obtain the foregoing advantages at relatively low cost.

Other objects of this invention will be apparent hereinafter from the specification and from the recital in the appended claims.

Figure 1:
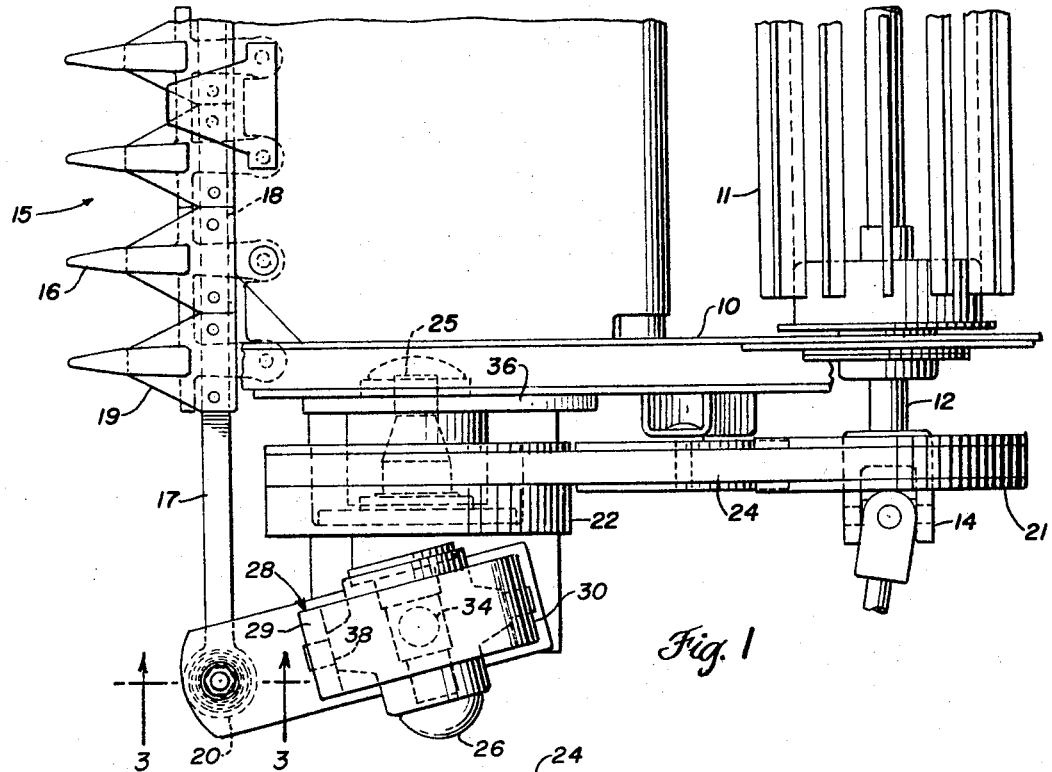
FIG. 1 is a fragmentary plan view of one end of a mower-hay conditioner showing a sickle drive having a connection assembly between a drive arm and a sickle head constructed according to this invention.
Figure 2:
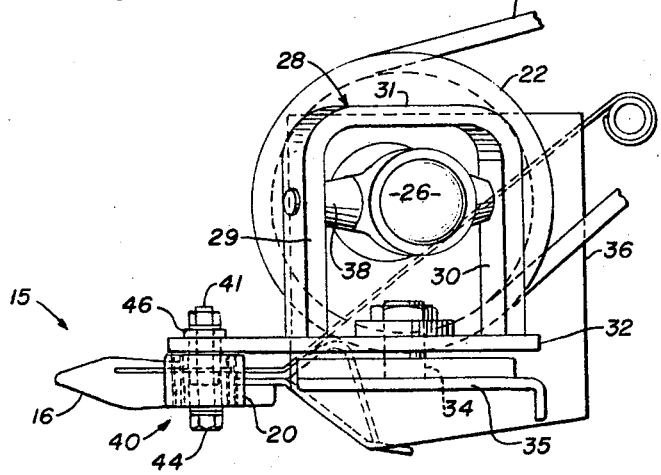
FIG. 2 is an end elevation of FIG. 1.

Referring now to the drawing by numerals of reference and particularly to FIG. 1, 10 is a support frame on which a crop conditioning roll 11 is rotatably mounted and having a shaft 12 to which power is transmitted through a universal joint 14 connected to a source of power, not shown. In front of roll 11 is a sickle 15 comprising stationary guard elements 16 and a reciprocable cutterbar 18 having triangular knife elements 19. The knife elements are riveted to the cuterbar, which has a laterally projecting portion 17 including a sickle head 20.

Carried on frame 10 and extending in parallel vertical planes are sheaves 21 and 22 interconnected by a drive belt 24. Sheave 21 is on shaft 12 of roll 11 and is rotated from the power source. Sheave 22 is connected to and rotates a shaft 25 journalled on frame 11. Shaft 25 has a diagonally and laterally outwardly extending wobble element 26 which projects through a yoke 28. The yoke has legs 29–30 which extend vertically; they are interconnected by a bight portion 31.

At their lower ends the legs 29–30 of the yoke fixedly connect to a horizontally extending drive arm 32 supported for rotation on the vertically extending axis of a pivot 34 rotatably carried on a horizontal plate 35 having a vertical section 36 rigidly connected to support frame 10. Wobble element 26 has laterally projecting arms 38 pivotally connected to the legs 29–30 of yoke 28. Thus, as shaft 25 rotates, wobble element 26 causes yoke 28 and drive arm 32 to oscillate. Such structure is generally conventional and, as far as the present invention is concerned, any other means could be provided to oscillate drive arm 32.

Figure 3:
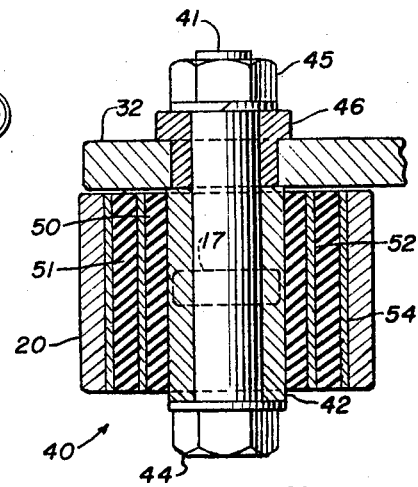
FIG. 3 is an enlarged section taken on the line 3—3 of FIG. 1 looking in the direction of the arrows and showing the details of the assembly.

This invention relates to the assembly which connects drive arm 32 to the sickle head 20, such assembly being shown best in FIG. 3 and generally denoted 40. This assembly comprises a pin 41 in the form of a bolt which extends through arm 32, through assembly 40 and head 20. A central collar 42 surrounds the shank of pin 41 and it is clamped thereto between the lower head 44 of the bolt and a nut 45. A cap 46 is included which is T-shaped in cross-section and surrounds the upper end of pin 41. These parts and arm 32 are locked to each other by the clamping force applied when nut 45 is tightened.

Assembly 40 comprises an inner resilient bushing 50 and an outer resilient bushing 51 concentric to each other and having axes parallel to the axis of pivot 34. Inner bushing 50 has an inner surface which tightly embraces the periphery of collar 42 and in such manner that rotatable movement of the two relative to each other is prevented. Between bushings 50 and 51 is a first metal sleeve 52. A second sleeve 54 surrounds outer bushing 51 and such sleeve is press-fit into sickle head 20 so that there is no relative rotation between the sleeve and sickle head. Further, the bushings 50 and 51 are so tightly pressed between sleeves 52–54 and the collar that their inner and outer surfaces are locked against rotatable movement relative to the surfaces which they engage. If desired, inner bushing 50 may be bonded by some adhesive to collar 42 and bushings 50–51 may be similarly bonded to sleeves 52 and 54 to provide a unitary, assembly of non-rotatable components. However, press fitting the parts will achieve the same result.

Preferably bushings 50 and 51 are made of a relatively hard rubber which will absorb shock loads when sickle 15 is reciprocated. But, a rubber is used having sufficient resiliency to provide enough torsional action of the bushings to take care of the pivoting needed between drive arm 32 and sickle head 20. In general the torsional action required exceeds the limits of one of the bushings 50–51 but is less than the combined limits of two.

When yoke 28 is oscillated by wobble element 26, drive arm 32 will oscillate in a clockwise direction from the position shown in FIG. 1 to a similar position on the opposite side of a horizontal plane through the axis of pivot 34. Then the arm will return. In its oscillation, arm 32 will swing through an angle in the range of twenty-five to thirty degrees. The connection 40 takes care of this angular movement of the drive arm through the torsional characteristics of the rubber in the bushings 50 and 51.

Since the pivoting of drive arm 32 relative to sickle head 20 is taken up by torsion of the resilient bushings 50 and 51, no lubrication is required in the connection during the life of the assembly. Lubrication is eliminated by the fact that there is no relative rotation of the bushings and sleeves relative to each other.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In a drive mechanism for reciprocating a sickle comprising in combination: a support, a drive arm extending in a horizontal direction, means connecting said drive arm to said support for oscillating said arm, a pin projecting through said arm in a location spaced from said fixed axis and extending parallel thereto, means connecting said pin to said arm to prevent rotation of the pin relative to the arm, a plural rate bushing assembly mounted on said pin and interposed between said sickle and said arm, said assembly having a collar surrounding said pin and fixed against rotation relative thereto, an inner resilient bushing surrounding said collar and having an inner cylindrical surface fixed against rotation relative to the collar, an outer resilient bushing surrounding said inner bushing, a sleeve interposed between said bushings, said inner bushing having an outer cylindrical surface and said outer bushing an inner cylindrical surface fixed against rotation relative to said sleeve, a sickle portion surrounding said outer bushing, and said outer bushing having an outer cylindrical surface fixed against rotation relative to said sickle portion, pivotal movement of said drive arm relative to said sickle upon oscillation of the drive arm being provided by torsional action of said inner and outer bushings through an angle generally in the range of twenty-five to thirty degrees and without rotatable sliding of the surfaces whereby the assembly does not require lubrication.

2. A drive mechanism as recited in claim 1 wherein a second sleeve surrounds said second bushing and is interposed between the second bushing and said sickle portion.

3. A drive mechanism as recited in claim 2 wherein the outer surface of said second bushing is fixed against rotation relative to said second sleeve and said second sleeve is prevented from rotation relative to said sickle portion by a press fit.

4. A drive mechanism as recited in claim 2 wherein said inner and outer bushings are made of hard rubber and the radial thickness of said bushings is substantially the same.

References Cited
UNITED STATES PATENTS

| | | | |
|---|---|---|---|
| 1,390,890 | 9/1921 | Dyer | 74—60 |
| 1,915,966 | 6/1933 | Wills | 74—60 |
| 2,073,419 | 3/1937 | Houdaille et al. | 287—85 |
| 2,095,947 | 10/1937 | Herold | 287—85 |
| 2,165,702 | 7/1939 | Haushalter | 287—85 |
| 2,619,839 | 12/1952 | Love | 74—60 |
| 2,827,792 | 3/1958 | Hopkins | 74—60 |
| 2,258,517 | 9/1941 | Rose | 56—296 |

FRED C. MATTERN, JR., *Primary Examiner.*

W. S. RATLIFF, *Assistant Examiner.*